United States Patent [19]

Kaye

[11] E Re. 28,948

[45] Reissued Aug. 31, 1976

[54] BATTERY CARTRIDGE WITH HOLLOW CASE OF MINIMUM WEIGHT AND DIMENSIONS

[75] Inventor: Gordon E. Kaye, Garrison, N.Y.

[73] Assignee: P. R. Mallory & Co., Inc., Indianapolis, Ind.

[22] Filed: Nov. 28, 1975

[21] Appl. No.: 635,826

Related U.S. Patent Documents

Reissue of:

[64] Patent No.: 3,887,394
Issued: June 3, 1975
Appl. No.: 394,031
Filed: Sept. 4, 1973

[52] U.S. Cl. ..... 136/173; 136/166; 220/4 E

[51] Int. Cl.[2] ..... H01M 1/02

[58] Field of Search ..... 136/173, 166; 220/4 E; 206/2

[56] References Cited

UNITED STATES PATENTS

| | | | |
|---|---|---|---|
| 777,451 | 12/1904 | Wappler | 136/173 |
| 3,388,007 | 7/1968 | Fiandt | 136/166 |
| 3,660,169 | 5/1972 | Clune et al. | 136/173 X |
| 3,661,649 | 5/1972 | Kaye | 136/173 X |
| 3,742,832 | 7/1973 | Stoneham | 136/173 X |
| 3,745,049 | 7/1973 | Kaye | 136/173 |
| 3,776,778 | 12/1973 | Azuma | 136/173 X |
| 3,794,525 | 2/1974 | Kaye | 136/173 X |

*Primary Examiner*—Winston A. Douglas
*Assistant Examiner*—John F. Niebling
*Attorney, Agent, or Firm*—Ronald S. Cornell; Israel Nissenbaum; Charles W. Hoffmann

[57] ABSTRACT

A battery cartridge having a hollow shell case with walls of minimum thickness, and of minimum weight and dimensions, over the minimum weight and volume dimensions of the contained battery cells, for use in portable devices such as radios, cameras, computers and the like, to thereby limit the space requirements of the cartridge and to limit the weight in excess of the cell weights.

28 Claims, 6 Drawing Figures

BATTERY CARTRIDGE WITH HOLLOW CASE OF MINIMUM WEIGHT AND DIMENSIONS

Matter enclosed in heavy brackets [ ] appears in the original patent but forms no part of this reissue specification; matter printed in italics indicates the additions made by reissue.

This invention relates to battery packages, and particularly to battery cartridges, constructed for direct simple insertion into operating position in small devices requiring electrical energization, such as cameras, radios, small pocket computers, and the like.

In small portable electrical operating devices, such as radios, cameras and computers, weight and volumeric space requirements are important and must be kept to a minimum. Since batteries are essential, their dimensions become the minimum limits in dimensions of the cartridge, and similarly their weight becomes the limits in minimum weights to which the cartridges can be reduced, as produced in any design. Therefore, in order to reduce dimensions and weight for the batteries for such portable devices, all the accommodating cartridge cases for the batteries should be made to have a minimum of volumetric space, and, consequently, they will also correspondingly have a minimum of weight.

Another feature of importance in connection with the application of batteries to such small portable devices, is the ease of insertion or application of the battery into the structure of the device, for connection to the built-in electric circuitry that is involved in the operation of the device.

The primary object of this invention is to provide an electric battery for such applications, assembled in a cartridge case form, and made available for insertion in the device as a cartridge.

Another object of the invention is to make a cartridge type battery, in which a cartridge case which contains the battery cells will be of minimum weight and of minimum volumeric dimension in excess of the minimum in volumetric space and weight of the battery cells themselves.

Another object of the invention is to make the cartridge case inexpensive to manufacture, so the entire cartridge may be discarded when the battery cells have given up all their available energy.

Another object of the invention is to provide a cartridge type battery, with a case that will be formed to embody a pilot element, that will require the cartridge to be inserted in a predetermined mode with respect to its receiving case, so the battery will be properly applied to the receiving circuit according to the polarity disposition of the system.

Another object of the invention is to provide a cartridge case that will be so small in dimension and so light in weight over and above the dimensions and weight of the battery cells, that the case itself will add very little to the space requirements and to the weight of the cells, when the cartridge is inserted into the electrical device in which the battery is to provide energy.

Another object of the invention is to provide a cartridge type battery, of several cells according to the voltage of the circuit to be served, in a simple cartridge case, which will be easily and readily insertable into a space or cavity provided for the purpose of receiving the cartridge case, for which the space dimensions of the cavity will be predesigned to permit simple and easy insertion of the cartridge, and require insertion in a definite mode, into operating position in the device to be served.

In order to reduce the weight of the cartridge case, this invention contemplates that the walls of the case shall be made as thin as possible. With walls as thin as is contemplated within this invention, there will be a problem in establishing the necessary free flow of the fluid plastic over a long linear path within correspondingly narrow spaces in the forming mold. The cartridge is therefore to be formed, according to the purpose of this invention, by designing and utilizing spaces, for certain necessary re-inforcing elements of the cartridge case, to serve as free running spaces in the mold for the fluid plastic to flow freely through longitudinal dimensions as runners, in order to permit the fluid plastic to flow from those runners through the short lateral paths into the free thin or narrow spaces designed for the thin wall structure of the cartridge case. Such runner elements, when formed, are utilized to serve as insulating spacers between adjacent cells in the cartridge case, as well as servings as re-inforcing elements for strengthening the thin walls of the cartridge case.

In addition, the cartridge is formed of two half-shells, either of which may serve as a transport for the cells, to hold them in proper related positions for electrical and physical assembling steps during the manufacturing operation. The cells are connected in series circuit, or in parallel circuit, relationship by appropriate connecting strips attached to the cells by appropriate welding operations. In order to hold the cells in such proper related position during the manufacturing assembly, each half shell is formed as a relatively shallow cup structure, generally rectangular, with a series of parallel flutes on the floor of the cup structure with the flute bottoms locating the thinnest section of the wall of the shell. The two sides of adjacent flutes rise to meet and merge to form a higher rib. During molding operations the rib space defines the space as a runner to permit free flow of the fluid plastic in the molding machine, and, then from those relatively large section longitudinal runners, the fluid plastic may flow readily laterally through the short path to the relatively thin section at the bottom of the flute, from both sides, to complete the flute bottom as the thin wall.

Normally, the thinness, or small dimension, at the base of the flute, will not permit the fluid plastic to flow very far in a linear dimension, and for that reason the fluid plastic can not flow the full length of the flute, in in the same direction as the flow in the rib forming spaces. However, in the present arrangement, the lateral path from each of the runner ribs down to the thin section at the bottom of the flute is sufficiently short to permit and to enable the plastic to flow through that short lateral path, from one side, to meet the fluid plastic flowing in from the other side of the flute, in order to form and complete the wall structure running along and between the bottoms of the several parallel flutes.

The parallel adjacent flutes serve as naturally concave seats, to position the generallly circular shape of the cells which they are to accommodate, and thus a fluted half-shell serves as a tray to carry the set of cells through a course of manufacturing steps during their assembly in the cartridge case, while adjacent cells in the tray are being connected by welded tabs for proper circuit connections, as they are moved through the successive steps of the manufacturing operation.

When the cells are respectively so properly electrically connected in the transport shell, the cover shell is then applied, and the two shell halves are then bonded and sealed by appropriate seals, such as a chemical or a supersonic bond, at the engaging rim edges. Those edges are provided, during the molding formation, with suitable molding pilot rib elements to assure that the two shell halves are properly related and fitted, to constitute the cartridge case as designed for closely fitting the included cells.

The two half-shells are further formed and provided with suitable openings, that will serve as windows, through which external terminals, connected to an external circuit, may project into the cartridge shell, to engage the appropriate cell terminals, or terminal surfaces of correct polarity for connection to the external circuit of the electrical device that is to be served by the battery. *Two such windows are situated non-symmetrically spaced transversely from a central axis of the case parallel to the direction of movement predesigned for the battery case into the apparatus to be serviced by the battery.*

A further feature of the invention is to provide a pilot, or guide rib, along the outside of one side wall of the cartridge case, to require that the battery cartridge will be inserted in proper mode to fit into its electrical device, to establish proper electrical connections.

The construction of the cartridge case is described in more detail in the following specification, taken together with the accompanying drawings, in which FIG. 1 is a perspective view of the cartridge case, open, with the two half-shells spaced apart, to expose the bottom half-shell and its inner construction at its front end;

FIG. 4A is a similar view of the corresponding end of the top half-shell.

The invention generally involves a battery comprising several cells, disposed with a closed molded hollow shell plastic case, to serve as a cartridge, which may be easily and readily inserted and fitted into a particularly small portable device that requires energy. The structural dimensions of the cartridge case are so designed to provide an ultimate hollow cartridge case of minimum weight, and consequently, the wall thickness is minimum in section in various parts, which small dimensions would introduce a problem of plastic flow in the molding machine. The construction of the cartridge case is therefore made such as to permit adequate fluid flow within the molding machine in certain spaces of the molding cavity for the cartridge case, from which the flow may then be readily achieved into those thin sections, through short paths, that otherwise could not be reached by a longitudinal flow of the plastic material in the molding machine, in the general longitudinal feeder paths.

Thus the cartridge case is a hollow shell with walls of minimum thickness, with suitable re-inforcement ribs whose spaces in the mold provide free fluid runners, in the molding operation, to feed the thin wall sections that normally could not be formed by the usual molding flow in the regular feed direction.

Figure 1:
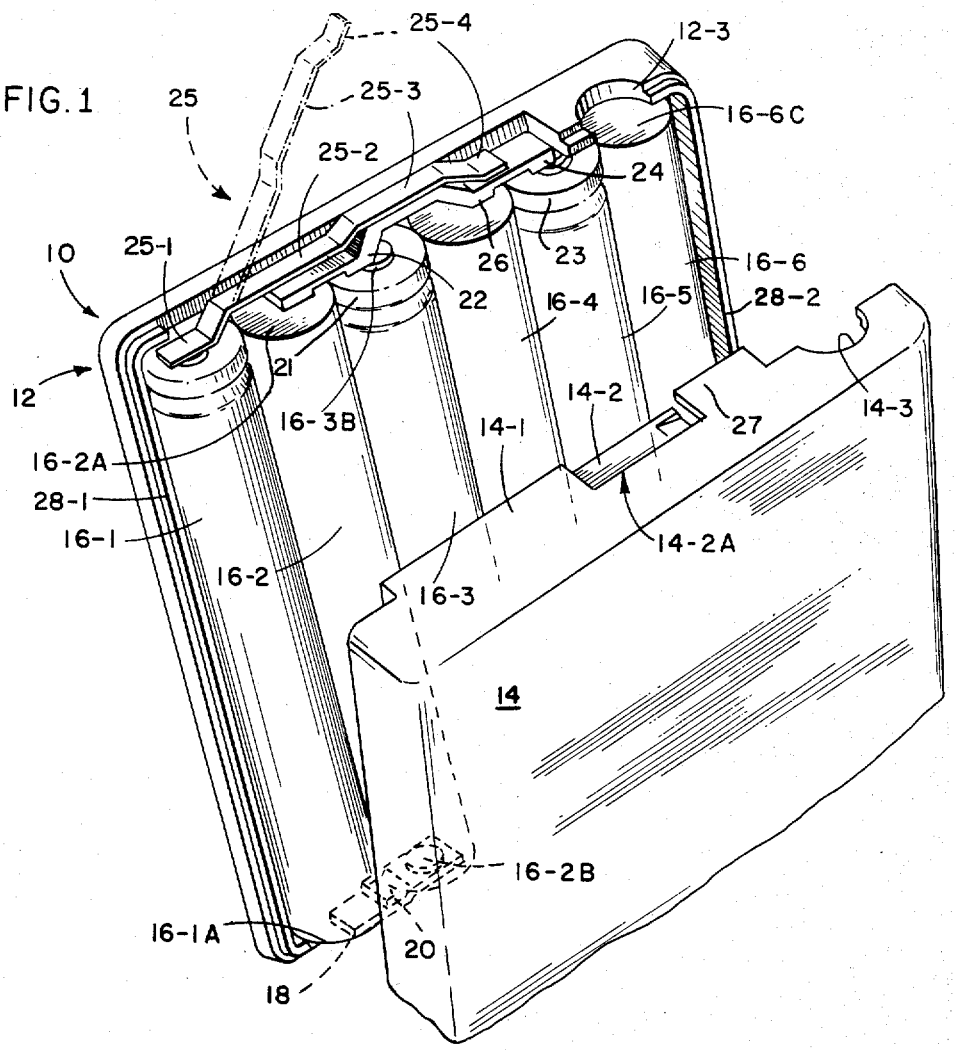

As shown schematically in FIG. 1, a cartridge case 10 is shown as comprising two hollow half-shells 12 and 14, one shown as a bottom tray 12, and the other as a cover or cap 14. Each half shell is formed as a molded plastic body, with a number of flutes [15] corresponding to the number of cells to be accommodated. In the construction shown in FIG. 1, the case 10, is formed to accommodate six elongated pencil type cells 16, numbered 16–1 to 16–6, which are arranged with their anode terminals alternately pointing in opposite directions, for easy circuit connection in a series circuit arrangement of the cells, which, in this case, will provide an overall voltage of nine volts, considering each cell to provide 1.5 volts. The shell 12 serves as a carrying tray or basket, to hold the cells in proper relative ultimate assembled position, while the assembly of cells in that half-shell 12 is being processed through the processing steps of the manufacturing operation.

Figure 2:
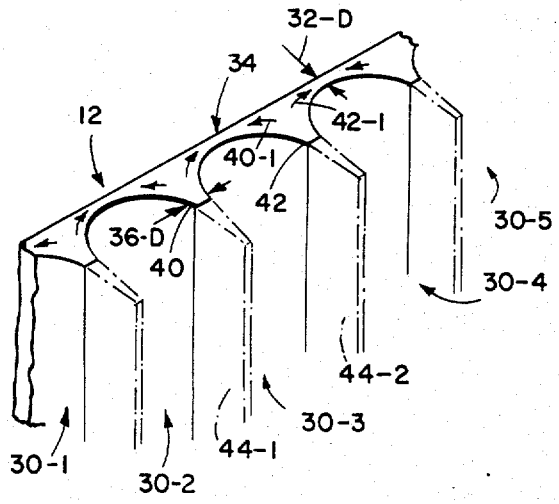
FIG. 2 is a perspective view of a portion of the bottom half-shell, to show the relatively thin section of flute bottom, and the greater flow section of the separator ribs, and the directions of flow from the separator rib flow sections into the thin flute bottoms, during formation in the mold.

During such assembling process, the cells 16–1 and 16–2, as positioned, will be electrically connected at the bottom of FIG. 1 by a series tab connector 18, which will be spot welded to the can 16–1A of cell 16–1, and to the anode terminal 16–2B of the cell 16–2, with a suitable insulating strip 20 disposed under the connecting tab 18 to prevent short circuiting of the cell 16–2. The cell cans do not touch and are separated by spacers and the positioning flutes, as seen in FIG. 2.

Similarly, cells 16–2 and 16–3 are connected by a conducting tab [22] between the can 16–2A and the anode 16–3B, over an insulator 21, with the cell cans not touching.

The bottom ends of the two cells 16–3 and 16–4 are similarly connected by a conducting tab that is spot welded to the can of cell 16–3 and to the downwardly pointing anode terminal of the cell 16–4, not visible in FIG. 1.

Again, cells 16–4 and 16–5 are joined by a conducting tab [24,] at the top of FIG. 1, which is appropriately spot welded to the can 16–4 and to the anode terminal of the cell 16–5, over a can insulator 23.

Figure 3:
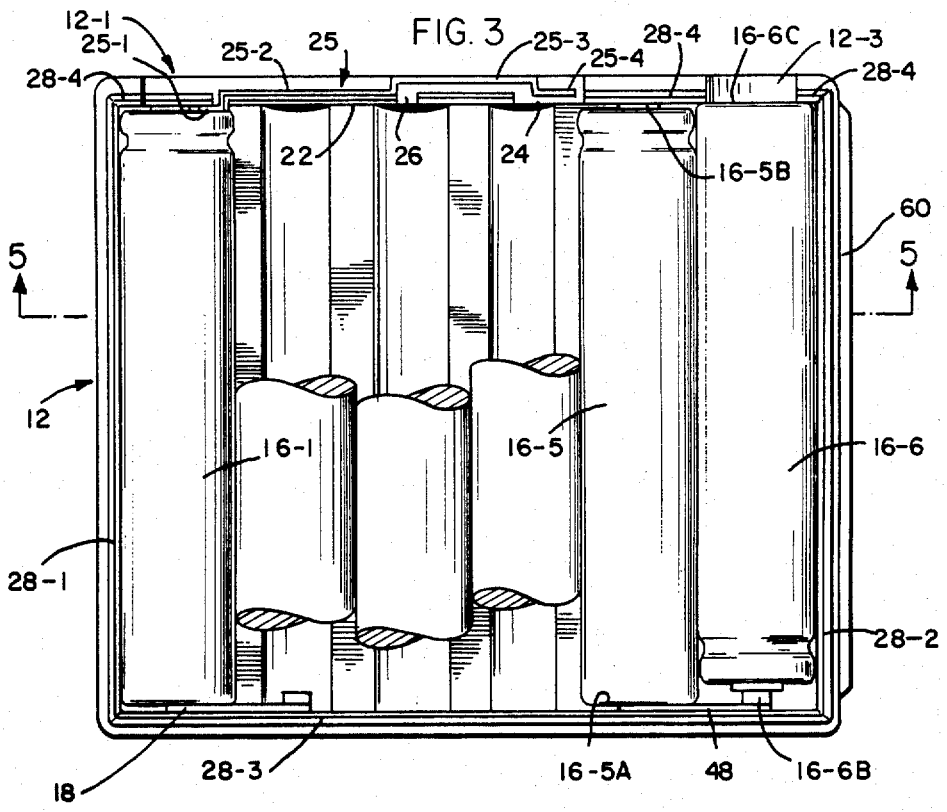
FIG. 3 is a plan view of the bottom half-shell of FIG. 1.

A similar tab connection [27] *48*, in FIG. 3, at the bottom of the can 16–5 is connected to the anode terminal at the bottom of the cell 16–6, leaving the can surface 16–6 [c] *C* of cell 16–6, exposed at the top of FIG. 1 and FIG. 3, to serve as the positive terminal of the battery, when fully assembled, for access for engagement by an external circuit terminal. A suitable insulator prevents shorting of cell 16–6.

In the final assembly of the cells to serve as a battery, in the cartridge case consisting of the two half-shells 12 and 14, it will be desirable to locate the terminal electrode surfaces of the battery at specific locations, in order to require the cartridge to be inserted in a specific mode, to enable the battery terminal surfaces to be properly engaged by pre-located circuit terminals of the device with which the battery is to be assembled.

For that purpose, the negative terminal of the cartridge battery is shown as provided by an extending metal strip, terminal tab 25, that is spot welded at one end 25–1 to the anode of cell 16–1, which is shown disposed at the left-hand top end of the half-shell 12. The tab 25 is generally of thin flexible copper, and embodies the tab end 25–1 which is to be welded to the cell 16–1, and embodies, further, an extending bridging strip 25–2, which is folded over a flange rib shelf 26, which latter serves as a support for strip 25 and as an insulating separator between the metal strip 25 and the conducting tab [ 21 ] connected between the two cells 16–2 and 16–3, and the tab [ 23 ] between the two cells 16–4 and 16–5. The terminal tab strip 25 further embodies a tab section 25–3, which serves as a terminal contact surface to be engaged by an external circuit terminal of the device to be serviced by the battery. The terminal strip 25 further embodies a portion 25–4 which serves as a hold-down or anchoring portion, to be held down by an appropriate pressure finger 27 integrally constructed on the cover half-shell 14, shown in FIGS. 1, 4 and 4A, so the terminal strip 25 will be held relatively firmly in position [ where ] *when* the two half-shells 12 and 14 are assembled. At the same time, the terminal strip 25 will be insulated from the underlying connecting tabs and electric cells by the two insulating shelf-type wing parts 22 and 24 that are integrally constructed on the half shell 12, as parts of flange rib support shelf 26 for the terminal tab strip 25.

The bottom half-shell 12 is also provided with positioning edge ribs 28–1 and 28–2, on the two opposite sides of the half-shell 12, and a similar rib 28–3, not shown in FIG. 1, but shown in FIG. 3, is provided at the bottom edge of the half-shell 12 for the same functional purpose of guiding the top or cover half-shell 14 into proper seating position on bottom helf-shell 12 to close the case, and to permit the two half-shells to be bonded and sealed either by a chemical bonding seal or by a supersonic heating effect between the rib edges of the two half-shells 12 and 14.

The cover or top half-shell 14 is constructed to embody a cover top-wall portion 14–1, which, in assembling of the case will lie on top [ or ] *of* the bridging portion 25–2 of the terminal strip 25 and hold that strip 25 against movement. Shell 14 further embodies an underlying shelf portion 14–2 which will slide into position under the top platform portion [ 25 ] of rib shelf 26, to provide additional support for the terminal strip 25 in the final assembly of the cartridge. The half shell 14 also embodies a semi-circular concave recess 14–3, which mates with a similar recess 12–3, to provide the necessary space to accommodate the [ anode ] *cathode* terminal 16–6 [ B ] *C* of cell 16, shown on the half-shell 12.

Right-hand top edge ribs 28–1 and 28–2, and a corresponding bottom rib, shown in FIG. 3, serve to guide the top half-shell 14 into proper fitting and mating position onto the bottom half-shell 12 by means of those ribs 28–1, 28–2 and rib 28–3, [ (not shown) ] so that the top edges of the two half-shells will properly meet to enclose the cells and to leave exposed (1) the surface of the [ anode ] *cathode* 16–6 [ B ] *C* through a window framed by openings 12–3 and 14–3; and (2) the space above the portion 25–3 of the negative terminal strip 25, will be visible and accessible through a window 14–2A, FIG. 1, as an open space above the supporting shelf 26 and the under shelf 14–2 that extends from the end edge of the shell 14–1 to give further support to shelf 26.

In FIG. 2, a schematic perspective is shown of a portion of the floor of the bottom shell 12, to illustrate certain features in the design construction which combine to form the cartridge case with thin walls and a minimum of material, and, consequently, with a minimum addition of weight beyond the basic unavoidable weight of the cells employed and housed in the cartridge case. As previously mentioned, the bottom cartridge half-shell 12 is shaped to embody a number of flutes corresponding to the number of cells to be accommodated, which in the case illustrated here is six cells, with six flutes 30–1 through 30–6. The feature of the invention which permits the molding of the shell case with such thin walls, for minimum volume of material, in order to achieve minimum weight, beyond the weight of the cells, involves the formation of the flutes in such manner as to produce a wall of a minimum thickness 32–D, at the bottom of each flute. The curvature of the flutes 30–1 to 30–6 need not correspond to the curvature of the cells. Since the top shell is similarly provided with fluted regions, each cell will be held in position by two fluted surfaces when the two half-shells are mated.

As shown in FIG. 2, the bottom of each flute locates the thinnest section of the wall that serves as the floor 34 of the half-shell 12. The narrow space in the mold at the flute bottoms, as indicated by the dimension **32–*D* between the arrows, is normally insufficient to permit free fluid flow longitudinally in the molding die to form the half-shell 12, from the fluid plastic normally flowing in the longiutdinal axial direction of the flutes. However, since the curvature of the flute provides a higher or thicker section 36–D, where the arcs of two adjacent flutes meet, to form a separating spacer, the space for that enlarged section, indicated by the dimension 36–D**, is utilized as an auxiliary runner through which the fluid plastic may flow freely, first, because it is flowing in the same direction, and, second, because it is flowing through a section large enough to permit such free flow.

The longitudinal section with the thickness dimension 36–D is therefore made by design, to be of sectional area at least sufficient to permit such free flow, in order that the space provided for that separator will be effective as a runner space for the fluid, from which free lateral flow may be achieved, into the medial line region of the flute 30–3 along the arrow paths 40–1. Similarly lateral flow through the short path 42–1 may occur from the auxiliary runner 42 along the opposite side of the flute 30–3. Thus, lateral flow from the two side runners 40 and 42, situated alongside the flute 30–3, may flow freely toward the median line through the relatively short paths 40–1 and 42–1, to complete the formation of the thin wall defined by the bottom of the flute 30–3. In that manner, the relatively large surface area of the cartridge case wall, or bottom, represents the surface of a relatively thin section of minimum weight, but of sufficient strength as re-inforced to serve as an enclosing box shell for the cells. The extra dimensional spacers and separators between the flutes also serve to separate the cells and to keep them from touching, which would cause short circuits. Thus, spaces in the mold for forming those separator ribs, between the flutes, provides sufficient cross-sectional area of flow to permit and to enable the fluid plastic in the mold to flow freely during the molding operation, so that the material in the runner spaces need flow only a short distance laterally, from each runner, down towards and into the narrow borrom or floor region of each flute. The separator rib, thus formed, therefore serves not only as a final spacer for the cells, but serves also as a molding runner, during the molding operation, to permit free flow of the fluid plastic in the normal longitudinal direction, from which the lateral flow is effected through the relatively small distance through which it can flow, that is sufficient to form the fluted floor structure, with its thin sectional dimension.

As indicated in FIG. 2 the height of the separator 40 or 42 may be extended to the dimension indicated in the higher rib partitions 44–1 and 44–2. Such additional heights of the ribs are generally unnecessary, by appropriate dimensioning of the runner sections 40 and 42, to keep the total weight of the cartridge case to a minimum.

FIG. 3 shows a plan view of the bottom half-shell 12, with three cells shown in place, to show the alternately reversed disposition. The terminal strip tab 25 is shown welded at one end to cell 16–1, and disposed in final seated position of the bridge platform 26, to expose the strip element 25–3 for external engagement. The two cells 16–5 and 16–6 are shown connected by the strip tab [27] *48* between cell surface 16–5A and anode 16–B. The pilot ribs 28–1, 28–2, 28–3 and 28–4 are shown, for clearer view [,] the flutes are not drawn in.

Figure 4:
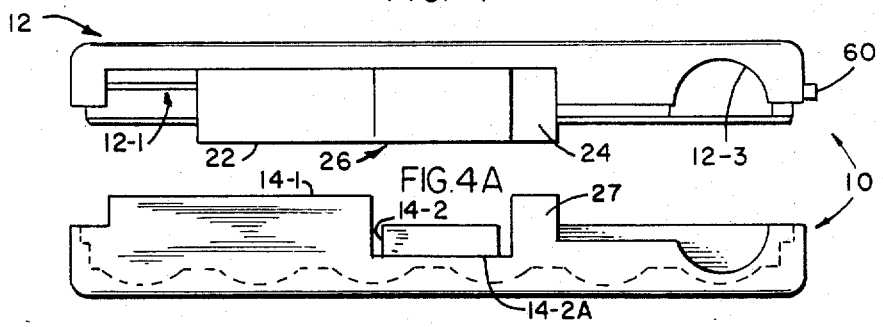
FIG. 4 is a top plan, or end view, of the bottom half-shell of FIG. 3.

FIG. 4 shows an end elevational view [liiking] *looking* down on the half-shell 12 of FIG. 3, and shows the bridge platform 26 for supporting the metal strip 25, with the two side portions 22 and 24 indicated. Also seen is the semi-circular opening 12–3 for access to the cathode can terminal of the cell 16–6. An opening 12–1 is for placement of strip end 25–1 on anode of cell 16–1 for welding.

FIG. 4A is a similar downward view, in elevation of the mating cover half-shell 14, shown in [quxtaposition] *juxtaposition* to the bottom half-shell 12. The top wall portion 14–1 will lie on top of the terminal strip 25, after the strip is welded to the anode terminals of cell 16–1, as shown in FIG. 3, at end portion 25–1. The underlying shelf 14–2 slides into position under the center bridge platform portion of rib shelf 26, to provide tight reinforcing support. The opening or window 14–2A, in the top wall of 14, directly above the underlying shelf 14–2, provides access to the metal strip 25, which serves as one electrode terminal of the battery. To hold the terminal strip 25 tightly in place, against undesired movement, an integral finger 27, on top wall of cover 14, slides over and presses on the free end 25–4 of the terminal strip 25. The semi-circular opening 14–3 mates with the semi-circular opening 12–3 to provide a window for access to the end surface 16–6C of the cell can, as the other polar terminal of the battery. *As alluded to above, and as is evident from FIGS. 1, 4 and 4A, these windows providing such exposures (1) and (2) are respectively non-symmetrically spaced with respect to the central axis of the casing, i.e., the axis parallel to the cells and central relative thereto.*

Figure 5:
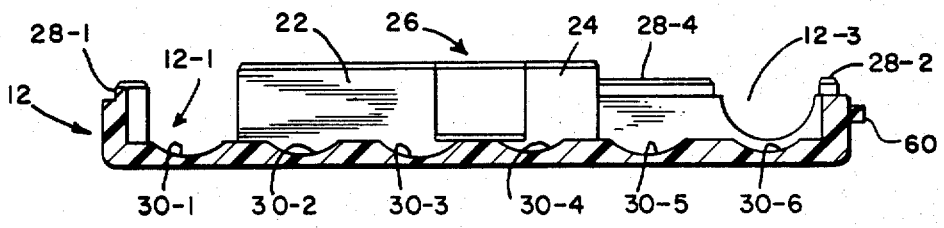
FIG. 5 is an upward view, partly in section, along the section line 5—5 of FIG. 3.

FIG. 5 shows a view partly in section and partly in elevation, looking upward at the half-shell 12 of FIG. 3, along the section line 5—5. The underside of flange bridge platform 26 is seen, with the two side wings 22 and 24. Here the flutes 30–1 to 30–6 are shown, that serve as positioning seats for the several cells 16–1 through 16–6. Opening space 12–1 is for access of a welding tool to weld terminal strip 25 to anode of cell 16–1, and opening 12–3 is for access of an external terminal to the cell 16–6 can end. Guide ribs 28–4 along top wall of 12 are shown. For sealing fit, the bottom half-shell 12 is provided with a peripheral shoulder to receive a complementary rim apron on the cover half-shell. A seal is formed by a chemical bonding and sealing material, or by ultrasonic bonding action.

To assure proper insertion of the battery case into the device in which the battery is to be utilized, the cartridge case is further provided with an insertion control guide rib 60 along one edge, as shown in FIGS. 3, 4, and 5. The device to be served, will of course be provided with a suitable space or receiving cavity and a guide rail to receive the guide rib 60 on the cartridge case 10.

Thus, by use of a hollow shell, as shown, for snugly engaging the cells of the battery, and for holding them in predetermined circuit arrangement, the shell can be made of minimum wall thickness, and therefore of minimum weight over and above the irreduceable weight of the cells.

The fluting serves to hold the cells against shifting. Further, the use of the flute limiting wall spaces, in the mold, as auxiliary runners for the fluid plastic, permits the case walls to be made of minimum thickness, since the lateral path of flow will be very short from the runner to the flute bottom, where the walls is thinnest. This feature of using the flutewall spacer as a runner during the molding operation is an important feature that enables the cartridge case to be made of minimum wall thickness, and consequently, of minimum size and weight over the weight and size of the cells.

The invention is not limited to the structural design shown, but may be modified within the spirit of the invention, as defined in the claims.

What is claimed is:

1. A battery for use with a portable apparatus, comprising a plurality of cells electrically connected in predetermined electrical relation, and providing two electrode terminals of the battery;

a case for said cells, consisting of a hollow shell of two co-fitting and mating parts having their internal surfaces shaped to fittingly engage and hold said cells in place;

said case having two windows for access from outside the case to said two electrode terminals of said battery, within said case, for engagement by two external circuit electrode terminals correspondingly positioned on an external apparatus to be serviced by said battery;

and means on said case to cooperate with a predesigned element of said apparatus for requiring the case to be properly positioned and also preventing the case from being improperly positioned in movement to its operating position relative to said apparatus, to assure proper engagement of said internal battery electrode terminals and said external circuit electrode terminals, whereby proper circuit connections will be made between said battery and the circuitry of said apparatus when the battery case is inserted to its operating position on said apparatus.

2. A battery, as in claim 1, in which said case has one side edge shaped to serve as a pilot guide to properly mate with and be guided by an element of said external apparatus, to thereby assure that the battery case is being properly inserted into said apparatus.

3. A battery, as in claim 1, in which said two windows are situated non-symmetrically spaced transversely from a central [axial] *axis* on said case, parallel to the direction of movement predesigned for said battery case into said apparatus to be serviced by said battery.

4. A hollow shell battery case, as in claim 1, designed and molded to be of minimum dimension and weight, comprising a base or platform shell having a floor shaped to embody a plurality of parallel grooves to accommodate a plurality of cylindrical electric cells of predetermined size in closely spaced parallel separation, with the thickness of the floor, at the bottom of each groove, being relatively of minimum self-sustaining dimension that is too small as a thickness space dimension in the forming mold to permit free longitudinal flow of fluid plastic along the length of each groove during the molding operation;

and integrally molded parallel spacers between said grooves to keep the cell bodies insulatingly spaced, the spaces for said spacers in the molding operation being of sufficient sectional dimensions to serve as runners to permit free longitudinal flow of fluid plastic during the molding operation, with lateral flow possible from said runner spaces through the short path to said thin floor space in the mold for forming the floor of each groove;

and end walls to limit and close the ends of said grooves and to serve as reinforcement to the thin floors at the bottom of each groove;

and a cover plate to cover and close said shell;

whereby said case is of minimum thickness, of minimum body material volume, and of minimum weight, to serve as a compact cartridge and assembly of a multi-cell battery, ready for immediate insertion as a cartridge into an apparatus to be energized from said battery.

5. A battery case, as in claim 4, to be of minimum possible weight, in which said cover is provided with shallow flutes in its inner surface above the respective grooves in the base shell, to cup and nestle each of the cells in cooperation with the grooves, to hold the cells in place against casual displacement in said case.

6. A battery case, as in claim 4, in which said platform shell is of relatively shallow cup shape with vertical side walls and end walls, and one end wall has two openings for accessibility from outside the case to the inside of the case;

and means constituting polar electrodes of the battery disposed within said shell directly adjacent said openings for engagement by an external circuit terminal of an external circuit for electrically connecting to said battery.

7. A battery case, as in claim 1, in which co-fitting pilot ribs and recesses are formed on the top edges of the walls of the respective parts of the shell, and on the under surface of the cover plate adjacent its edges, for controlling proper closure fit of the cover on the shell bottom for final sealing of the two parts of the case.

8. A battery, as in claim 1, in which said two electrode terminals of the battery are entirely within the case and accessible only through said windows.

9. A battery for use, as in claim 1, in which a contact element *is disposed* within said case and behind one of said windows, to be engaged by an external circuit terminal.

10. A battery, as in claim 9, in which said contact element consists of a metallic strip electrically connected to a terminal cell of the battery and is disposed to present a contact area under one of said windows, to be accessible for engagement by an external circuit terminal.

11. A battery, as in claim 10, in which said metallic strip has inherent resiliency to provide reaction pressure against an applied external terminal to establish desirable resilient contact pressure.

12. A battery, as in claim 11, in which the case structure embodies an integral element to support and back stop said contact element in line with said access window.

13. A battery, as in claim 11, in which said metallic element is anchored at one end to a terminal cell;

and said case embodies co-acting integral elements that anchor the other end of said metallic strip to prevent any shifting movement of the strip from predetermined operative position.

14. A battery, as in claim 8, in which the two terminal cells of said battery are remotely separated within said case;

and a first window is disposed above, and adjacent, one terminal cell and the second window is spaced from said first window and from the neighborhood of the other terminal cell of said battery;

and a conducting strip is connected to said other terminal cell and extends to space under said second window to be accessible for engagement by an external circuit terminal.

*15. A battery comprising a flat casing having a hollow interior, a wall of said casing extending transversely of an axis central to said casing, said wall defining first and second terminal contact surface exposing openings therethrough on a further axis parallel to an edge of said wall, said first and second openings being spaced non-symmetrically from said casing central axis, and cell means including a plurality of cells supported by said casing parallel to said casing central axis and electrically interconnected in predetermined electrical relation for providing a first terminal contact surface interiorly of said wall and a second terminal contact surface, said first and second terminal contact surfaces being of respective different electrical polarities and being in juxtaposition respectively with the said first and second openings and thereby engageable by electrodes correspondingly positioned on external apparatus only upon movement of at least one of said electrodes interiorly of said wall through said first opening.*

*16. The battery claimed in claim 15 further including an electrically conductive member electrically connected to a polar surface of one of said cells for providing said second terminal contact surface.*

*17. The battery claimed in claim 15 wherein said first terminal contact surface is a polar surface of one of said cells.*

*18. The battery claimed in claim 15 wherein said casing is comprised of opposed half shells joinable to define said casing interior, each said shell having first and second edge cutout portions, said first cutout portions providing said first opening and said second cutout portions providing said second opening.*

*19. The battery claimed in claim 16 wherein said electrically conductive member includes a metallic strip having one end thereof disposed interiorly of said wall and*

*fixedly electrically connected to said one cell polar surface.*

*20. The battery claimed in claim 19 wherein the end of said metallic strip opposite said one end thereof is also disposed interiorly of said wall, an extent of said metallic strip between said ends thereof defining said second terminal contact surface.*

*21. A battery comprising a flat casing having a central axis parallel to the direction of movement predesigned for insertion of said casing into external apparatus to be serviced by said battery, said casing having a hollow interior, a wall of said casing extending transversely of said casing central axis, said wall defining first and second terminal contact surface exposing openings therethrough on a further axis parallel to an edge of said wall, said first and second openings being spaced non-symmetrically from said casing central axis, and cell means including a plurality of cells supported by said casing parallel to said casing central axis and electrically interconnected in predetermined electrical relation for providing a first terminal contact surface interiorly of said wall and a second terminal contact surface, said first and second terminal contact surfaces being of respective different electrical polarities and being in juxtaposition respectively with the said first and second openings and thereby engageable by electrodes correspondingly positioned on external apparatus only upon movement of at least one of said electrodes interiorly of said wall through said first opening.*

*22. The battery claimed in claim 21 further including an electricaly conductive member electrically connected to a polar surface of one of said cells for providing said second terminal contact surface.*

*23. The battery claimed in claim 22 wherein said electrically conductive member includes a metallic strip welded to said one cell polar surface and extending therefrom to and across at least a portion of said second opening.*

*24. The battery claimed in claim 23 wherein said first terminal contact surface is a further polar surface of one of said cells.*

*25. A battery comprising a flat casing having a hollow interior, a wall of said casing extending transversely of an axis central to said casing, said wall defining first and second openings therethrough on a further axis parallel to an edge of said wall and providing access to said casing interior, said first and second openings being spaced non-symmetrically from said casing central axis, and a plurality of cells supported by said casing parallel to said casing central axis and electrically interconnected in predetermined electrical relation thereby providing polar surfaces interiorly of said wall, said surfaces having different electrical polarities, said first and second openings enabling electrical contact between said polar surfaces and an external device and said battery further including an electrically conductive member electrically connected to one of said polar surfaces of said cells and extending therefrom to one of said openings.*

*26. The battery claimed in claim 25 wherein the other polar surface of said cells is aligned with the other of said openings.*

*27. The battery claimed in claim 25 wherein said casing is comprised of opposed half shells joinable to define said casing interior, each said shell having first and second edge cutout portions, said first cutout portions providing said first opening and said second cutout portions providing said second opening.*

*28. The battery claimed in claim 25 wherein said electrically conductive member includes a metallic strip joined to the polar surface to which it is connected.*

* * * * *